United States Patent
Kwon et al.

(10) Patent No.: US 10,074,863 B2
(45) Date of Patent: Sep. 11, 2018

(54) SYSTEM AND METHOD FOR CONTROLLING FUEL CELL OF VEHICLE

(71) Applicants: Hyundai Motor Company, Seoul (KR); Kia Motors Corporation, Seoul (KR)

(72) Inventors: Sang Uk Kwon, Gyeonggi-do (KR); Heon Joong Lee, Seoul (KR); Nam Woo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 240 days.

(21) Appl. No.: 14/833,940

(22) Filed: Aug. 24, 2015

(65) Prior Publication Data
US 2016/0211536 A1 Jul. 21, 2016

(30) Foreign Application Priority Data

Jan. 19, 2015 (KR) .................... 10-2015-0008867

(51) Int. Cl.
*H01M 8/04* (2016.01)
*H01M 8/04089* (2016.01)
*H01M 8/04992* (2016.01)
*H01M 8/04746* (2016.01)
*H01M 8/0432* (2016.01)
*H01M 8/04492* (2016.01)
*H01M 8/04537* (2016.01)

(52) U.S. Cl.
CPC ... *H01M 8/04104* (2013.01); *H01M 8/04365* (2013.01); *H01M 8/04753* (2013.01); *H01M 8/04992* (2013.01); *H01M 8/04492* (2013.01); *H01M 8/04619* (2013.01); *H01M 2250/20* (2013.01); *Y02T 90/32* (2013.01)

(58) Field of Classification Search
CPC ......... H01M 8/04492; H01M 8/04507; H01M 8/0438
See application file for complete search history.

(56) References Cited

U.S. PATENT DOCUMENTS

| | | | |
|---|---|---|---|
| 7,517,600 B2 | 4/2009 | Arthur et al. | |
| 2001/0024746 A1* | 9/2001 | Ueda | H01M 8/04089 429/423 |
| 2002/0006537 A1* | 1/2002 | Kobayashi | H01M 8/04014 429/414 |
| 2007/0287041 A1* | 12/2007 | Alp | H01M 8/04007 429/414 |
| 2016/0006060 A1* | 1/2016 | Kwon | H01M 8/04395 429/442 |
| 2016/0126566 A1* | 5/2016 | Iio | H01M 8/04111 429/444 |

FOREIGN PATENT DOCUMENTS

| | | |
|---|---|---|
| JP | 2007-172971 A | 7/2007 |
| JP | 2009-043596 A | 2/2009 |
| JP | 2012-003981 A | 1/2012 |
| KR | 2007-0019716 A | 2/2007 |
| KR | 2010-0037660 A | 4/2010 |
| KR | 10-2013-0137738 A | 12/2013 |
| KR | 10-1350183 B1 | 1/2014 |
| WO | 2011/033879 A1 | 3/2011 |

* cited by examiner

*Primary Examiner* — Matthew J Merkling
(74) *Attorney, Agent, or Firm* — Mintz Levin Cohn Ferris Glovsky and Popeo, P.C.; Peter F. Corless

(57) ABSTRACT

A system and method for controlling a fuel cell of a vehicle are provided. The method includes sensing a time point when pressure control is necessary by sensing whether an output of the fuel cell is additionally necessary or whether the fuel cell can be in a dry-out state. In response to sensing that the pressure control is necessary, a required valve opening degree of an air outlet is derived by substituting a target air pressure for a data map. A fuel cell air outlet valve is then adjusted based the derived valve opening degree of the air outlet.

24 Claims, 15 Drawing Sheets

SYSTEM AND METHOD FOR CONTROLLING FUEL CELL OF VEHICLE

CROSS-REFERENCE(S) TO RELATED APPLICATIONS

This application claims priority to Korean Patent Application No. 10-2015-0008867, filed on Jan. 19, 2015, which is incorporated herein by reference in its entirety.

BACKGROUND

Field of the Invention

Exemplary embodiments of the present invention relate to a system and method for controlling a fuel cell of a vehicle, which secures reliability of variable pressure control through prevention of fuel cell performance deterioration and system malfunction.

Description of Related Art

To prevent performance deterioration of a fuel cell stack, humidity maintenance control is compulsory. Particularly, in a high-temperature/high-output region, the stack is liable to being dried out due to the humidity limit performance of the fuel cell. Accordingly, a method to limit an output has been used which may, however, cause driver's dissatisfaction to reduce the output performance of the vehicle for the prevention of stack deterioration. Thus, the present invention proposes a method of improving a humidity situation by operating a fuel cell system without using the method to limit an output.

In the fuel cell system as illustrated in FIG. 3, performance deterioration occurs due to the humidity limit performance in a high-output/high-temperature situation, and thus the output is deteriorated from state 1 to state 2. To prevent such performance deterioration, a method to pre-limit an output has also been proposed. However, this method accompanies reduction of the operation performance, and thus is unable to provide a basic solution. Further, many methods to increase operation pressure have been proposed to improve the humidity state of the system.

To increase the operation pressure, an air compressor and an opening adjustment valve may be used. However, this may increase power consumption of an accessory drive and may cause noise to occur in the air compressor. In one developed technology of the related art, a method to perform pressure operation only on a specific condition that a dry-out situation is sensed by measuring moisture content of the stack or estimating humidity has been proposed. Like the present invention, this technology adopts the variable pressure control. However, in performing the variable pressure control, the present invention proposes an improved technology to secure reliability for flow rate/pressure control.

The terms described as a background technology of the present invention are merely to improve understanding of the background of the present invention, and should not be accepted to concede that the terms correspond to the related art already known to those of ordinary skill in the art.

SUMMARY

Exemplary embodiments of the present invention are directed to a system and method for controlling a fuel cell of a vehicle to secure reliability of variable pressure control by preventing fuel cell performance deterioration and system malfunction. Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with an exemplary embodiment of the present invention, a method for controlling a fuel cell of a vehicle may include determining whether pressure control for pressing air discharged from an air supplier is necessary based on whether an output of the fuel cell is additionally necessary or whether the fuel cell is in a dry-out state; and in response to determining that the pressure control is necessary, deriving an opening degree of a valve required for the pressure control and adjusting the valve based on the derived opening degree of the valve. The determination may include determining that the pressure control is necessary when an operation temperature of the fuel cell is equal to or greater than a reference temperature when the output of the fuel cell is equal to or greater than a reference output or when the fuel cell is in the dry-out state.

The method for controlling a fuel cell may further include determining whether an atmospheric pressure control for changing a pressure of air discharged from the air supplier to an atmospheric pressure is necessary when flooding occurs during a pressure operation for adjusting the valve with the opening degree of the valve required for the pressure control; and deriving the opening degree of the valve required for the pressure control and adjusting the valve based on the derived opening degree of the valve in response to determining that the pressure control is necessary.

The controlling may include selecting a target air pressure; and deriving a valve opening degree command to follow the selected target air pressure. A flow rate of the air discharged from the air supplier and the target air pressure may respectively have values within preset limit regions with respect to the air flow rate and air pressure. The deriving a valve opening degree command may include deriving the valve opening degree command using an opening degree map in which the target air pressure and the valve opening degree to follow the target air pressure are pre-mapped.

In the opening degree map, the target air pressure and the valve opening degree to follow the target air pressure may be pre-mapped differently based on the flow rate of the air discharged from the air supplier and an operation temperature of the fuel cell. The opening degree map may be pre-mapped in which the opening degree during the pressure control is less than the opening degree during the atmospheric pressure control. In addition, the opening degree map may be pre-mapped in which a required valve opening degree is decreased as the operation temperature of the fuel cell is increased when the target air pressure is about equal to the air flow rate.

The target air pressure may include a first air pressure in an atmospheric pressure state and a second air pressure in a pressure state, and the opening degree map may be pre-mapped in which a required valve opening degree becomes a first opening degree when the target air pressure is the first air pressure and the required valve opening degree becomes a second opening degree when the target air pressure is the second air pressure.

Furthermore, the opening degree map may be pre-mapped to decrease the required valve opening degree between the first opening degree and the second opening degree when the target air pressure is in a section in which the target air pressure is increased from the first air pressure to the second air pressure. The opening degree map may further be pre-mapped to change a required valve opening degree with a hysteresis band based on a change of the flow rate of the air. The opening degree map may be pre-mapped to change a required valve opening degree in process of time when a maximum slew rate is limited.

The method for controlling a fuel cell may further include fixing a maximum value of a stoichiometric ratio (SR) to a minimum value when the pressure control is completed. Additionally, the method for controlling a fuel cell may include increasing a maximum value of a stoichiometric ratio (SR) based on an increase of the opening degree of the valve during the atmospheric pressure control. The fixing may include adjusting the maximum value of the SR to gradually decrease the maximum value of the SR before the pressure control is completed with a slope and to reach the minimum value when the pressure control is completed.

Determination of a pressure control completion time may be based on a calculation of a pressure ratio obtained by calculating (current opening degree–first opening degree)/(second opening degree–first opening degree), and the current opening degree may be a valve opening degree at the current time, the first opening degree may be an opening degree required when an air pressure is an atmospheric pressure, and the second opening degree may be an opening degree at a time when the pressure control is completed. The pressure ratio may have a value between 0 and 1, the maximum value of the SR may be in reverse proportion to an increase of the pressure ratio, and the maximum value of the SR may be equal to the minimum value of the SR when the pressure ratio is 1.

The method for controlling a fuel cell may further include calculating a pressure ratio obtained by calculating (current opening degree–first opening degree)/(second opening degree–first opening degree), and the current opening degree may be a valve opening degree at the current time, the first opening degree may be an opening degree required when an air pressure is an atmospheric pressure, and the second opening degree may be an opening degree at a time when the pressure control is completed. The method for controlling a fuel cell may further include increasing a target hydrogen pressure based on an increase of the calculated pressure ratio.

The method for controlling a fuel cell may further include increasing the target hydrogen pressure based on an increase of a flow rate of the air discharged from the air supplier, wherein the level of the target hydrogen pressure increased based on the increase of the flow rate of the air differs based on the pressure ratio. Additionally, the method for controlling a fuel cell may include comparing the derived opening degree of the valve with a detected actual opening degree of the valve; and limiting the output of the fuel cell when the derived opening degree of the valve is greater than the actual opening degree of the valve. The method for controlling a fuel cell may further include comparing the derived opening degree of the valve with a detected actual opening degree of the valve; and maximally increasing the opening degree of the valve when the derived opening degree of the valve is greater than the actual opening degree of the valve.

Furthermore, the method for controlling a fuel cell may include comparing the derived opening degree of the valve with a detected actual opening degree of the valve; and limiting a maximum revolutions per minute (RPM) of the air supplier when the derived opening degree of the valve is greater than the actual opening degree of the valve. The method for controlling a fuel cell may further include comparing the derived opening degree of the valve with a detected actual opening degree of the valve; and fixing a maximum value of a stoichiometric ratio (SR) when the derived opening degree of the valve is greater than the actual opening degree of the valve. The method for controlling a fuel cell may further include maximally increasing the opening degree of the valve when the deviation of cell voltages of the fuel cell becomes equal to or greater than a predetermined value.

According to the method for controlling a fuel cell of a vehicle having the above-described configuration, fuel cell performance deterioration and system malfunction may be prevented, and thus reliability of the variable pressure control may be secured. The air pressure may be adjusted by adjusting the opening degree adjustment valve on the side of the air outlet to prevent an abrupt change of the air pressure caused by an abrupt change of the opening degree. Accordingly, the operation may be performed without deviating from the operation limit region. Further, the hydrogen supply pressure and air supply SR may be optimally adjusted, and even a fail-safe operation strategy may be proposed in adjusting the air opening degree to secure reliability for the opening degree control.

BRIEF DESCRIPTION OF THE DRAWINGS

The above and other features and advantages of the present disclosure will be more apparent from the following detailed description taken in conjunction with the accompanying drawings.

DETAILED DESCRIPTION

Figure 1:
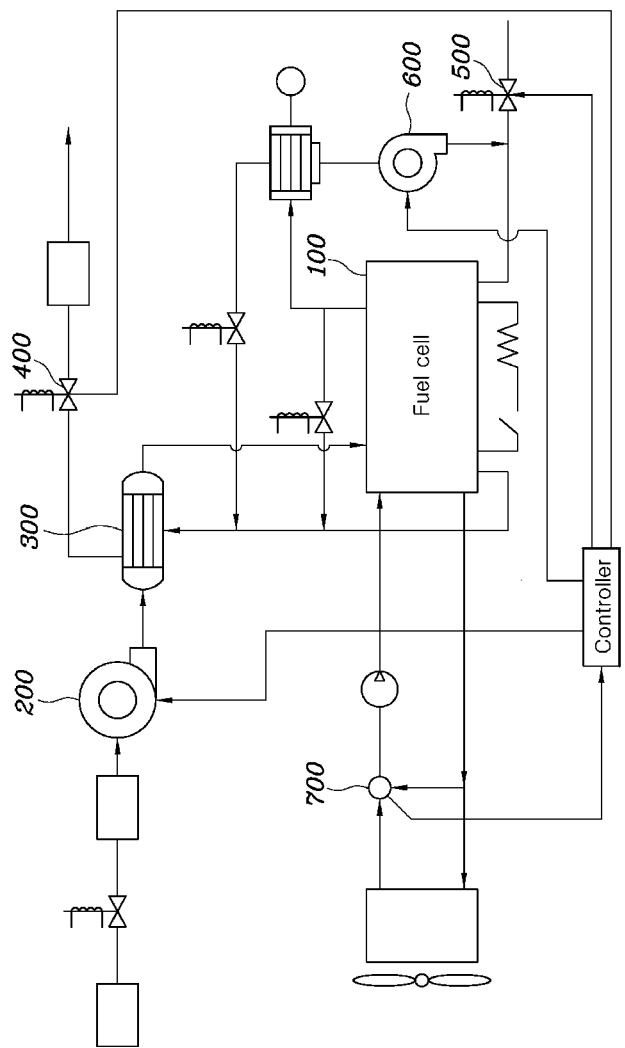
FIG. 1 is a diagram illustrating the configuration of a fuel cell system of a vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention will be described below in more detail with reference to the accompanying drawings. The present invention may, however, be embodied in different forms and should not be construed as limited to the exemplary embodiments set forth herein. Rather, these exemplary embodiments are provided so that this disclosure will be thorough and complete, and will fully convey the scope of the present invention to those skilled in the art. Throughout the disclosure, like reference numerals refer to like parts throughout the various figures and exemplary embodiments of the present invention.

Figure 2:
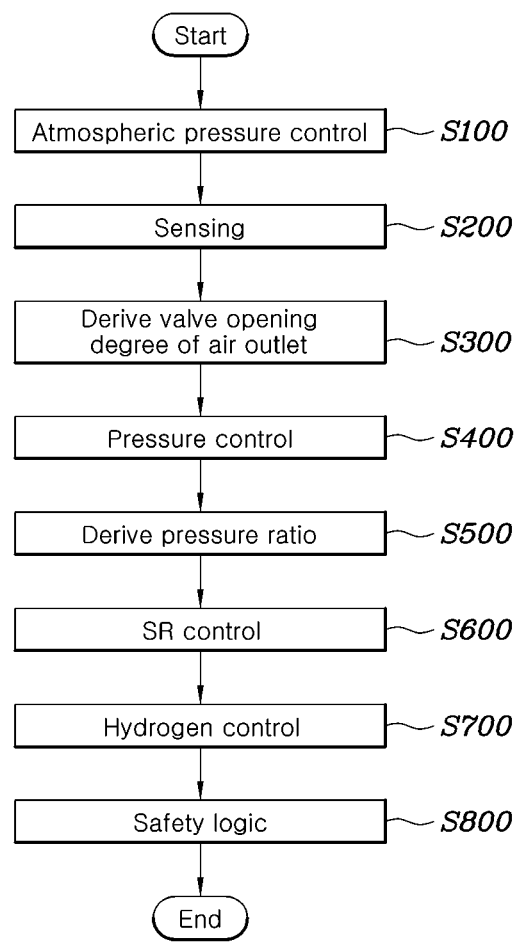
FIG. 2 is a flowchart illustrating a method for controlling a fuel cell of a vehicle in accordance with an exemplary embodiment of the present invention.
Figure 3:
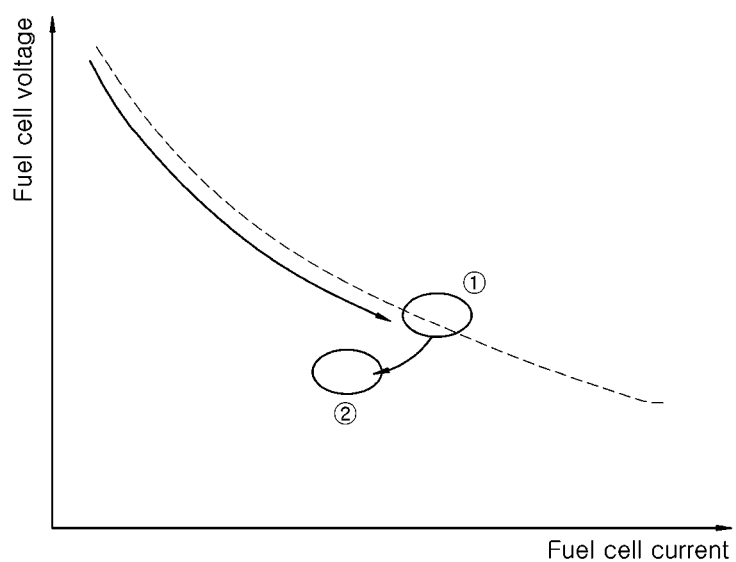
FIG. 3 is a graph illustrating performance deterioration of a fuel cell of a vehicle according to the related art.
Figure 4:
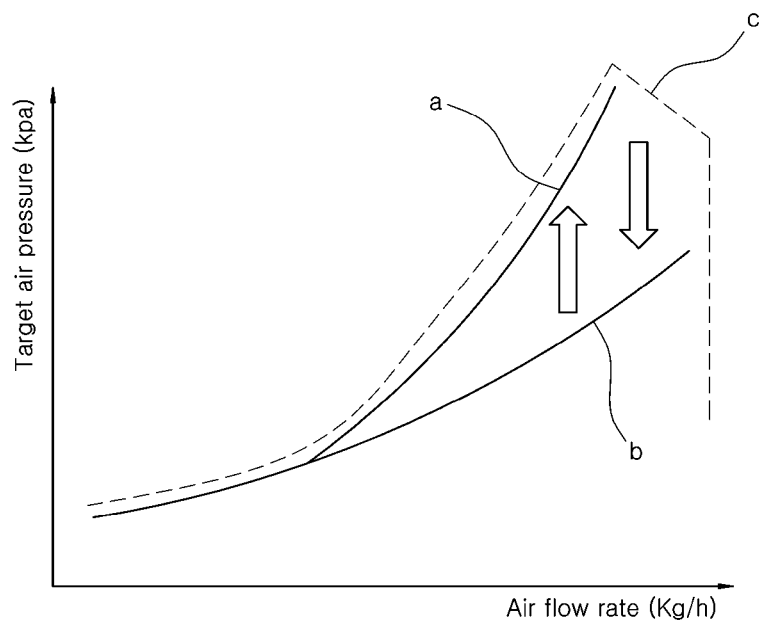
FIG. 4 is a diagram illustrating a data map in a method for controlling a fuel cell of a vehicle in accordance with an exemplary embodiment of the present invention.
Figure 5:
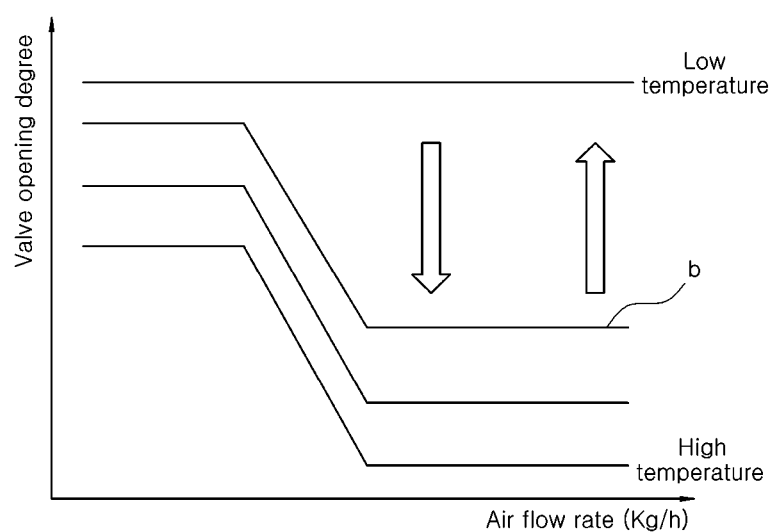
FIG. 5 is a graph illustrating a relationship between an air flow rate and a valve opening degree of an air outlet in a method for controlling a fuel cell of a vehicle in accordance with an exemplary embodiment of the present invention.
Figure 6:
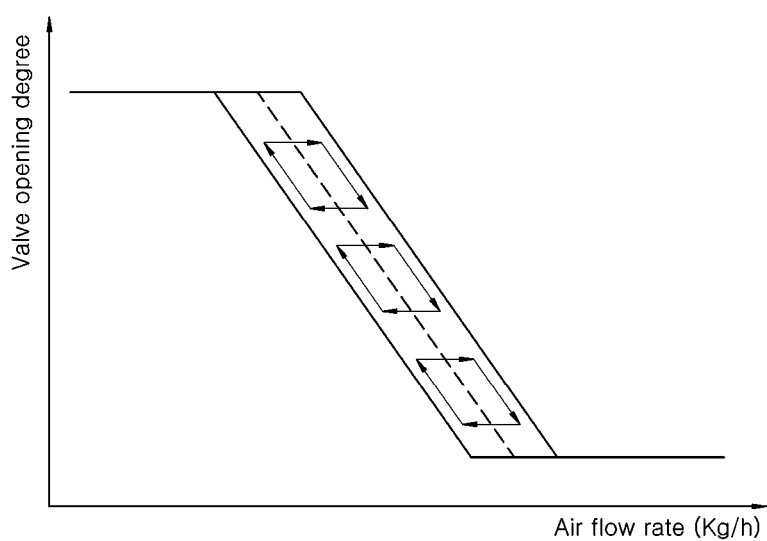
FIGS. 6 and 7 are graphs illustrating a valve opening degree of an air outlet in a method for controlling a fuel cell of a vehicle in accordance with an exemplary embodiment of the present invention.
Figure 7:
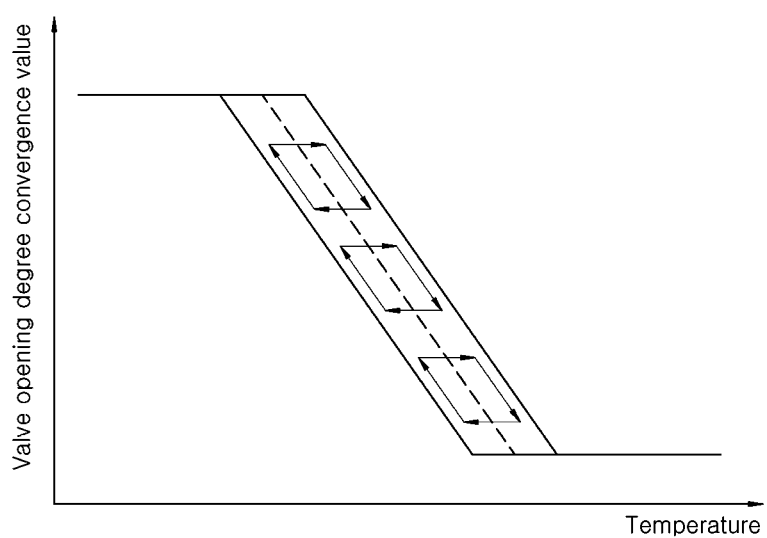
Figure 8:
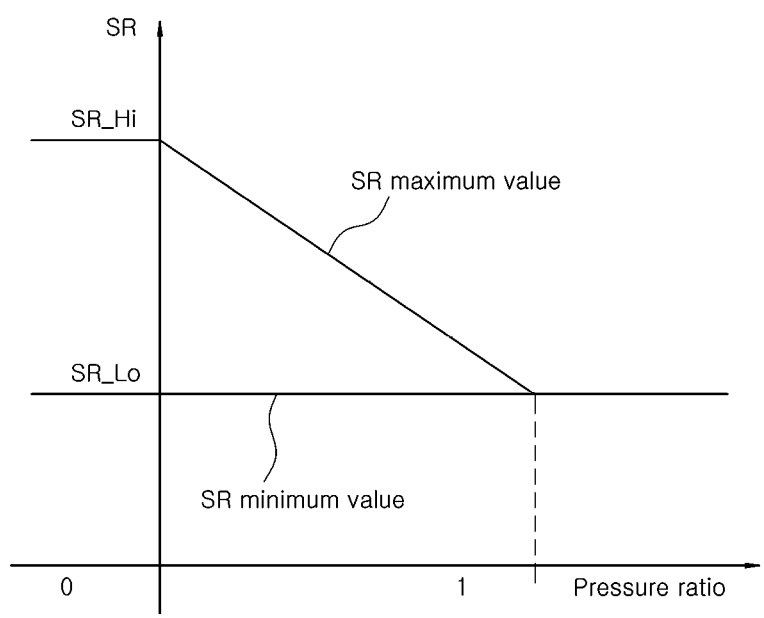
FIGS. 8 to 10 are graphs illustrating an SR, a pressure ratio, and hydrogen pressure in a method for controlling a fuel cell of a vehicle in accordance with an exemplary embodiment of the present invention.
Figure 9:
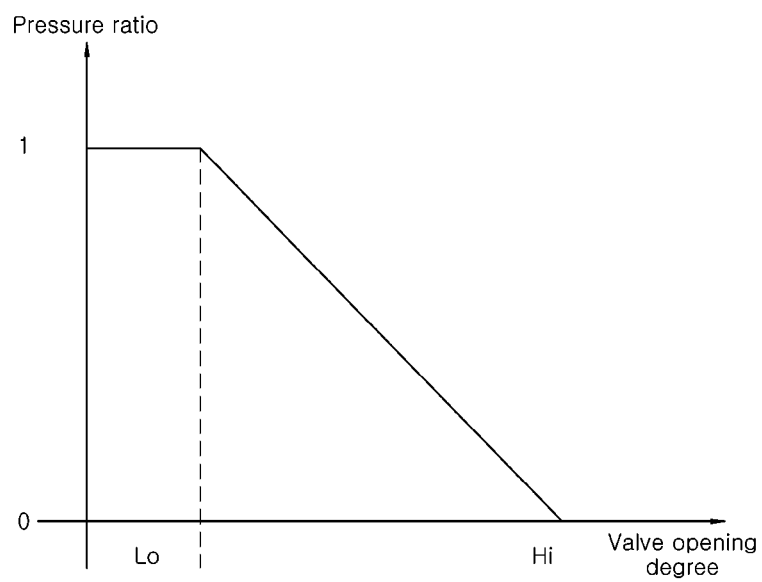
Figure 10:
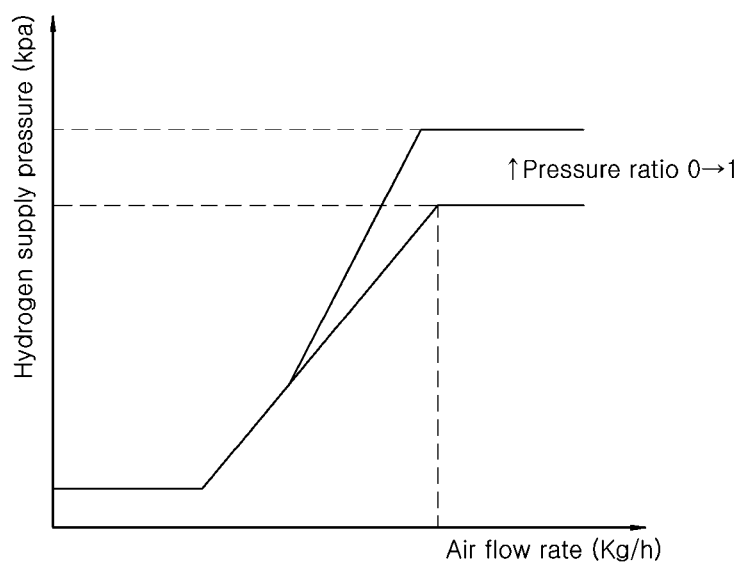
Figure 11:
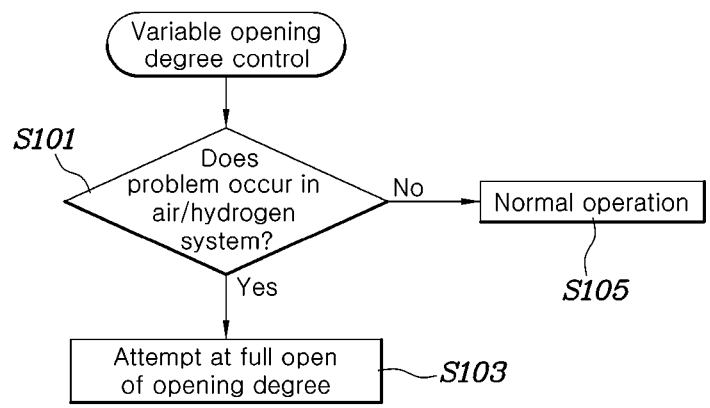
FIGS. 11 to 13 are flowcharts schematically illustrating fail-safe control in association with variable opening degree control in accordance with an exemplary embodiment of the present invention.
Figure 12:
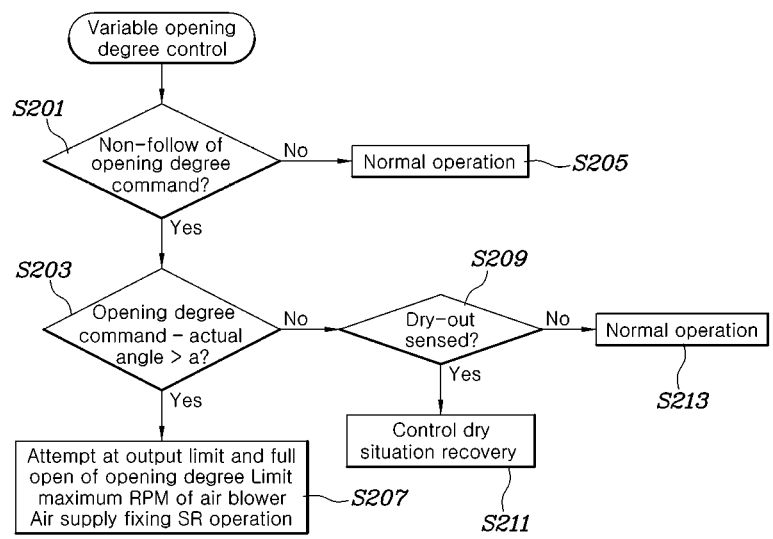
Figure 13:
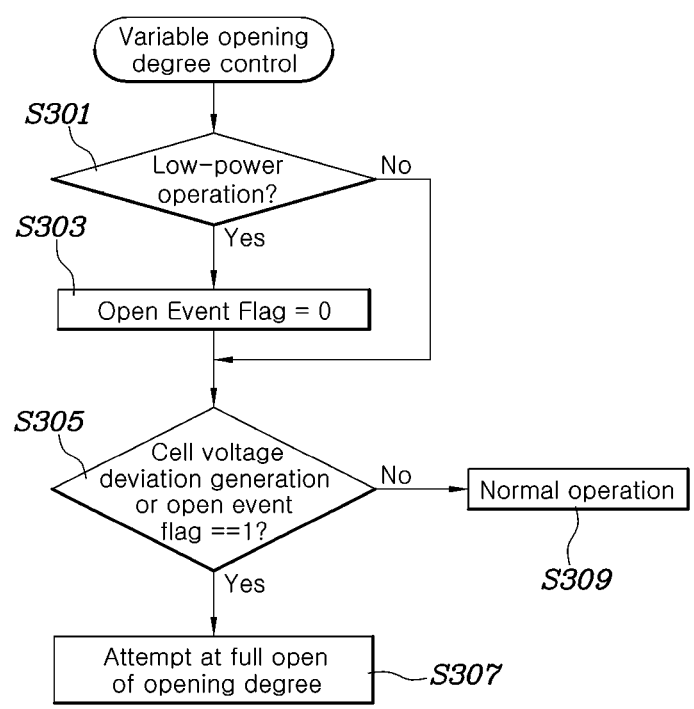
Figure 14:
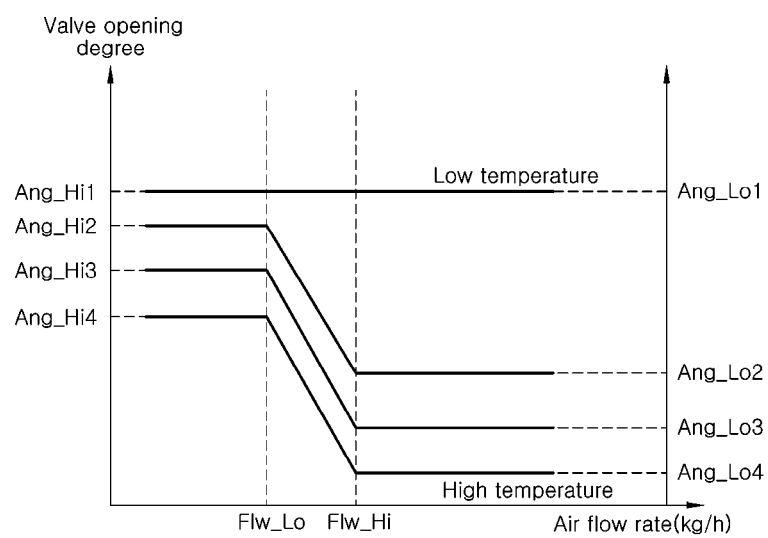
FIG. 14 is a graph illustrating changes of air flow rates and valve opening degrees in accordance with temperatures in accordance with an exemplary embodiment of the present invention.
Figure 15:
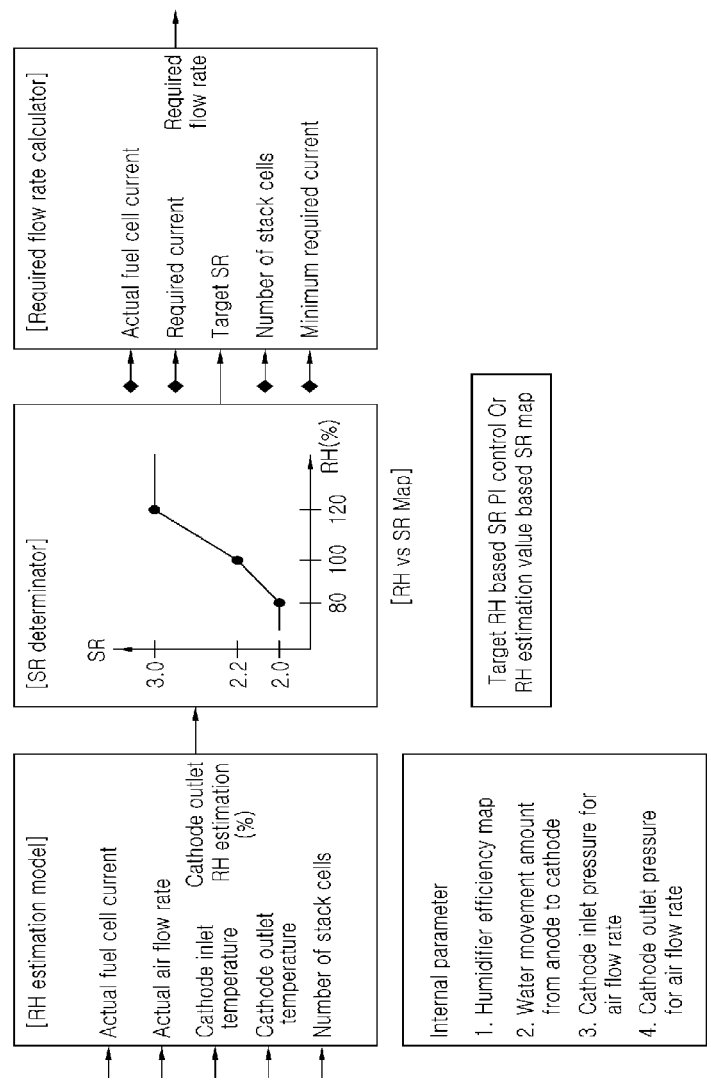
FIG. 15 is a diagram illustrating SR variable control based on relative humidity estimation according to an exemplary embodiment of the present invention.

FIG. 1 is a diagram illustrating the configuration of a fuel cell system of a vehicle according to the related art, and FIG. 2 is a flowchart illustrating a method for controlling a fuel cell of a vehicle in accordance with an exemplary embodiment of the present invention. FIG. 4 is a diagram illustrating a data map in a method for controlling a fuel cell of a vehicle in accordance with an exemplary embodiment of the present invention, and FIG. 5 is a graph illustrating a relationship between an air flow rate and a valve opening degree of an air outlet in a method for controlling a fuel cell of a vehicle in accordance with an exemplary embodiment of the present invention. FIGS. 6 and 7 are graphs illustrating a valve opening degree of an air outlet in a method for controlling a fuel cell of a vehicle in accordance with an exemplary embodiment of the present invention. FIGS. 8 to 10 are graphs illustrating an SR, a pressure ratio, and hydrogen pressure in a method for controlling a fuel cell of a vehicle in accordance with an exemplary embodiment of the present invention. FIGS. 11 to 13 are flowcharts schematically illustrating fail-safe control in association with variable opening degree control in accordance with an exemplary embodiment of the present invention. FIG. 14 is a graph illustrating changes of air flow rates and valve opening degrees in accordance with temperatures in accordance with an exemplary embodiment of the present invention, and FIG. 15 is a diagram illustrating SR variable control based on relative humidity estimation according to an exemplary embodiment of the present invention.

FIG. 1 is a diagram illustrating the configuration of a fuel cell system of a vehicle. A fuel cell system includes a hydrogen supply system, an air supply system, and a cooling system, and a separate fuel cell load device. The air supply system includes an air blower 200 for air supply, a humidifier 300 for humidification, and a separate outlet opening degree adjustment valve 400 for air pressure control. The hydrogen supply system includes a hydrogen supply valve 500, a hydrogen outlet condensed water valve, a hydrogen purging valve, and a hydrogen recirculator 600. The cooling system includes a water pump configured to supply cooling water, a radiator and a radiator fan configured to cool water dissipation, and a thermostat 700 configured to adjust an amount of water in a radiator loop and a bypass loop. The fuel cell load device may be used to prevent an increase of a stack voltage during worm-up of the fuel cell 100 or start/shutdown thereof. The fuel cell load device may be a resistor, a chargeable high-voltage battery, or other load devices.

In the present invention, the temperature of a fuel cell 100 may be measured by a cooling water thermostat 700, and a controller may be configured to adjust the opening degree of an air supplier 200 or a fuel cell air outlet valve 400. Further, the controller may be configured to adjust air and hydrogen pressures and an SR by operating a hydrogen supply valve 500 or a hydrogen recirculator 600.

FIG. 2 is a flowchart illustrating a method for controlling a fuel cell of a vehicle in accordance with an exemplary embodiment of the present invention. In the flowchart, the subject of the control method may be the controller configured to execute the method. A method for controlling a fuel cell of a vehicle in accordance with an exemplary embodiment of the present invention may include sensing a time point when pressure control is necessary (S200) by sensing whether an output of the fuel cell is additionally necessary or whether the fuel cell is in a dry-out state; in response to sensing that the pressure control is necessary, deriving a required valve opening degree of an air outlet (S300) by substituting a target air pressure for a data map; and adjusting a fuel cell air outlet valve 400 based on the derived valve opening degree of the air outlet (S400).

In other words, the controller may be configured to determine whether the pressure control for pressing air discharged from an air supplier 200 is necessary based on whether the output of the fuel cell is additionally necessary or whether the fuel cell is in the dry-out state, and in response to determining that the pressure control is necessary, the controller may be configured to derive the opening degree of the valve required for the pressure control and adjust the valve based on the derived opening degree of the valve. When the target air pressure for the pressure control is first selected, a valve opening degree command to follow the selected target air pressure may be derived, and thus the valve may be adjusted based on the derived valve opening degree.

The controller may be configured to further determine that the pressure control is necessary when an operation temperature of the fuel cell 100 is equal to or greater than a reference temperature when the output of the fuel cell 100 is equal to or greater than a reference output or when the fuel cell 100 is in the dry-out state. The flow rate of the air discharged from the air supplier 200 and the target air pressure may respectively have values within preset limit regions with respect to the air flow rate and the air pressure. In FIG. 4, a portion c expressed by a dotted line indicates an operation limit region as a preset limit region. When an operation is performed in a region that deviates from the operation limit region, the air supplier 200 may be damaged, and thus it is required to increase the pressure in the operation limit region.

A valve opening degree command may be derived from an opening degree map in which the target air pressure and the valve opening degree to follow the target air pressure may be pre-mapped. In the opening degree map, the target air pressure and the valve opening degree to follow the target air pressure may be pre-mapped differently based on the flow rate of the air discharged from the air supplier 200 and the operation temperature of the fuel cell. Further, the opening degree map may be pre-mapped to decrease the opening degree during the pressure control to be less than the opening degree during an atmospheric pressure control. Further, when the operation temperature is less than a preset reference temperature, the atmospheric pressure control may correspond, and accordingly, the pre-mapped opening degree map that corresponds to the atmospheric pressure control may be used.

The target air pressure may be divided into a first air pressure in an atmospheric pressure state and a second air pressure in a pressure state. In particular, the opening degree map may be pre-mapped to map the valve opening degree as a first opening degree when the target air pressure is the first air pressure, and map the valve opening degree as a second opening degree when the target air pressure is the second air pressure. Further, the opening degree map may be pre-mapped to decrease the required valve opening degree between the first opening degree and the second opening degree when the target air pressure is in a section in which the target air pressure is increased from the first air pressure to the second air pressure.

Particularly, the opening degree map may be pre-mapped to change a required valve opening degree with a hysteresis band based on a change of the flow rate of the air. Further, the opening degree map may be pre-mapped to change the required valve opening degree in process of time when a maximum slew rate is limited. Even when the target air pressure is substantially high, the opening degree values may be equal when the flow rate is increased, and the target air pressure may be increased based on the increase of the air flow rate. The valve opening degree may be equally maintained based on the increase of the air flow rate, but when the control is changed from the atmospheric pressure control to the pressure control the open degree value may be decreased.

Moreover, when flooding occurs in the fuel cell 100 when the pressure control is required and the valve is adjusted with the opening degree of the valve 400 required for the pressure control, the opening degree of the valve 400 required for the atmospheric pressure control for changing the air pressure discharged from the air supplier 200 to the atmospheric pressure may be derived, and the valve 400 may be adjusted based on the derived opening degree of the valve.

In the case of the fuel cell 100, by adjusting the valve 400 on the side of the air outlet that discharges air to an exterior, the air pressure of the fuel cell may be adjusted. The fuel cell may be at the atmospheric pressure in a normal state where the normal operation is performed and on the pressure condition on which the fuel cell provides high output at a pressure that is greater than the atmospheric pressure in the normal state. In general, the atmospheric pressure control for operating the fuel cell at the atmospheric pressure may be performed first (S100). Then, the time point when the pressure control is necessary may be sensed (S200) by sensing whether an output of the fuel cell is additionally necessary or whether the fuel cell is in the dry-out state.

Specifically, when the output of the fuel cell is equal to or greater than a reference output and the temperature is equal to or greater than a reference temperature, the controller may be configured to sense that the pressure control is necessary (S200). In other words, the high output may be necessary or the dry-out of the fuel cell may be expected. In contrast, when the low output is necessary or flooding occurs, the atmospheric pressure control may be necessary. In response to sensing that the pressure control is necessary, the required valve opening degree of the air outlet may be derived by substituting the target air pressure for a data map (S300).

FIG. 4 is a diagram illustrating a data map in a method for controlling a fuel cell of a vehicle in accordance with an exemplary embodiment of the present invention, and shows the relationship between the target air pressure and the air flow rate. The target air pressure may be increased on a high output condition, and the pressure control may be performed. The lower curve of the graph that is positioned below is curve b on an atmospheric pressure condition, and when the pressure is equal to or greater than a preset pressure, the curve a moves as a pressure condition. A boundary line outside the graphs indicates an operation limit region. Accordingly, even when the pressure operation is performed, the graphs should be basically positioned within the operation limit region c.

In general, the discharge flow rate of an air blower may be decreased as the system pressure is increased at about the same RPM of the air blower, and the air blower may be damaged when the operation is performed as deviating from the operation limit region. Accordingly, the pressure may be increased in the operation limit region. In the case of the pressure operation, the operation may be performed while deviating from the operation limit region during the low output to cause a problem to occur. Further, in the case of pressing during the low output, the amount of pressure increase may be insignificant, and thus the pressure effect may be minimal. Accordingly, variable pressure operation may be performed during the high output in consideration of stability and effectiveness.

To maximize the pressure effect, the target air pressure during the pressing may be set to perform the operation up to a region that is just before the operation limit region (it is necessary to secure a margin), and the pressing may be performed during middle/high output according to circumstances. The opening degree rate to follow the target pressure may be preset and stored in the controller as a map.

Although the opening degree control may be performed through feedback of the pressure on the side of the air outlet in real time without the opening degree map, a more accurate pressure sensor may be required for the control and an opening degree control actuator having high responsibility, and unstable control elements may be increased due to disturbance influencing the pressure. Accordingly, the opening degree map that corresponds to (e.g., follows) the target pressure may be set through preparatory experiments to be stored in a memory of the controller and an actual angle may be adjusted to follow the opening degree control map (e.g., data map).

Furthermore, in the data map, the opening degree amount may be reduced to increase the pressure based on the increase of the flow rate, the opening degree amount may be made to differ based on the operation temperature of the fuel cell (e.g., the opening degree amount to follow the target pressure may differ based on the operation temperature). Additionally, according to the shift reference to the pressure or the atmospheric pressure, the pressure operation may be performed in substantially high temperature situation in the middle/high output state, and the atmospheric pressure operation may be performed at substantially low temperature or in the low output state. Further, when the dry-out situation is sensed, the pressure operation may be performed without any condition regardless of the operation temperature, and when a cell voltage deviation occurs due to flooding occurrence or the like during the pressure operation, the atmospheric pressure operation may immediately return.

FIG. 5 is a graph illustrating a relationship between an air flow rate and a valve opening degree of an air outlet in a method for controlling a fuel cell of a vehicle in accordance with an exemplary embodiment of the present invention. When the air flow rate and the temperature of the fuel cell are determined, the valve opening degree of the air outlet may be determined using the illustrated graph. Further, the graph of the valve opening degree of the air outlet converges to a predetermined convergence value d. Specifically, the air flow rate may be derived using the target air pressure as shown in FIG. 4, and the valve opening degree of the air outlet may be derived using the air flow rate and the temperature of the fuel cell. During the derivation, the graph related to the target air pressure and the air flow rate may be positioned within the operation limit region.

During the derivation as shown in FIG. 6, the valve opening degree of the air outlet may be adjusted in reverse proportion to the air flow rate with a slope. Further, as shown in FIG. 7, the air outlet valve opening degree convergence value may be adjusted in reverse proportion to the temperature of the fuel cell with a slope. In other words, in setting the opening degree control data map, the opening degree map may be set based on the air flow rate, and a predetermined slope may be applied to a transitional section of the opening degree map change based on the air flow rate to remove the unstable control elements due to an abrupt opening degree change (see FIG. 14). Further, to prevent the opening degree from being sensitively changed with respect to the change of the air flow rate and the change of the temperature, a hysteresis band as illustrated may be used. In particular, in addition, the maximum slow rate may be limited with respect to the opening degree change in process of time, and thus an abrupt change in process of time may be limited.

The method for controlling a fuel cell may further include SR controlling for adjusting the maximum value of a stoichiometric ratio (SR) of the fuel cell to the minimum value SR_Lo when the pressure control is completed. Further, during the SR controlling, as shown in FIG. 8, the maximum value of the SR may be adjusted to gradually decrease with a slope and reach the minimum value SR_Lo. In other words, the maximum value of the SR may be adjusted to gradually decrease with the slope from the SR before the pressure control is completed and become the minimum value SR_Lo when the pressure control is completed.

The determination of a pressure control completion time may be based on calculation of a pressure ratio obtained by calculating (current opening degree−first opening degree)/(second opening degree−first opening degree), wherein the current opening degree is a valve opening degree at the current time, the first opening degree is an opening degree required when an air pressure is an atmospheric pressure, and the second opening degree is an opening degree at a time when the pressure control is completed. FIG. 8 shows that the maximum value of the SR may be decreased with the slope from the SR maximum value SR_Hi to the SR minimum value SR_Lo. During the atmospheric pressure control, the maximum value of the SR may be increased based on the increase of the valve opening degree.

Further, in consideration of the transitional section until the actual pressing is completed, the pressure ratio concept may be introduced (e.g., whether the opening degree command reaches the final target pressure command and whether the actual opening degree reaches the final target pressure opening degree are all considered). The pressure ratio may have a value between 0 and 1. When the pressure ratio is 1, the maximum value of the SR may be the SR minimum value SR_Lo, and when the pressure ratio is 0, the maximum value of the SR may have the SR maximum value SR_Hi. The maximum value of the SR may be in reverse proportion to the increase of the pressure ratio. When the pressure ratio is 1, the actual opening degree reaches the final target opening degree of the pressure operation, and the maximum value of the SR becomes equal to the minimum value of the SR. Until the pressure reaches 1, the maximum value of the SR may linearly decrease to the SR minimum value SR_Lo.

Moreover, the SR control may be performed (S600) to decrease the SR of the fuel cell with the slope based on the pressure ratio. The slope in the SR control may be a slope that connects two points (pressure ratio 0, SR maximum value) and (pressure ratio 1, SR minimum value). Accordingly, during the pressure control, the valve opening degree of the air outlet and the SR maximum value may be adjusted, and the SR maximum value may be slowly decreased based on the pressure ratio. When the pressure ratio is 1 that corresponds to the pressure completion, the SR maximum value may finally converge to the SR minimum value.

After the ratio derivation, hydrogen supply pressure may be adjusted to increase a slope as the pressure ratio increases using the graph having the slope increased based on the increase of the air flow rate as shown in FIG. 10 (S700). FIG. 10 illustrates that as the pressure ratio is increased from 0 to 1, the hydrogen supply pressure and its convergence value may be increased. After the opening degree is adjusted, the pressure ratio may be calculated by (current opening degree−first opening degree)/(second opening degree−first opening degree), and the target hydrogen pressure may be increased based on the increase of the air flow rate discharged from the air supplier.

The level of the target hydrogen pressure that is increased based on the increase of the air flow rate may differ based on the pressure ratio (e.g., the current opening degree is a valve opening degree at the current time, the first opening degree is an opening degree that is required when the air pressure is the atmospheric pressure, and the second opening degree is an opening degree at a time when the pressure control is completed). For example, with the increase of the calculated pressure ratio, the target hydrogen pressure may be increased.

In the fuel cell system, it is required to maintain the anode-side pressure greater than the cathode-side pressure at an appropriate level. Accordingly, it is required to increase the hydrogen supply pressure based on the increase of the air pressure, and in the same manner as described above, the target hydrogen pressure may be set from pressure ratio information that represents the pressure ratio. In the transitional section, a middle value of the target hydrogen pressures at pressure (pressure ratio 1) and at atmospheric pressure (pressure ratio 0) may be used.

In addition, when the air supply system or the hydrogen supply system of the fuel cell is in error (e.g., an error or failure occurs), safety logic for opening all the air outlet valves may be performed (S800). Particularly, when a difference between the target control value of the valve opening degree of the air outlet and the current opening degree value becomes equal to or greater than a predetermined value, or when a deviation of cell voltages of the fuel cell becomes equal to or greater than a predetermined value, the air outlet valves may be all opened.

Referring to FIGS. 11 to 13, when the cell voltage deviation occurs, it is considered that the current situation is a flooding situation, and the control may be performed in the order of additional air supply, additional hydrogen purge, and output limit based on the level of the cell voltage deviation. Separately, when the cell voltage deviation is sensed (e.g., the cell voltage deviation that corresponds to the level of the additional air supply is sensed) in relation to the variable pressure operation, the control may be performed not to perform the pressure operation.

Particularly, when the cell voltage deviation is sensed during the pressure operation, the opening degree may be a full open state, and the pressure operation may switch over to the atmospheric pressure operation. At the same time, an SR variable operation (e.g., the atmospheric pressure operation and in this case, the SR maximum value is increased) may be automatically set to facilitate the discharge of water to an exterior, and thus the flooding situation may be overcome. In particular, even when the cell voltage deviation is mitigated, the operation state may not be immediately shifted to the pressure operation state, but a low output atmospheric pressure operation may be performed before the pressure operation becomes possible again. When the atmospheric pressure/pressure operation is immediately shifted based on whether the cell voltage deviation is mitigated, the system operation may become unstable due to the frequent change of the opening degree control.

When the opening degree is adjusted to be less than an intended opening degree command, i.e., in a closing direction, the operation may be performed over the operation limit region (surge operation), and thus output limit, air blower operation limit, attempt of full open of the opening degree, and fixed SR operation may be performed. The extent of opening degree error and the sensing time may be properly selected. When the opening degree is adjusted to be greater than the intended opening degree command, i.e., in an opening direction, the humidity situation may be weakened since a desired pressure operation is not performed. Further, the controller may be configured to sense whether the humidity situation is weakened (e.g., IV slope characteristic, impedance measurement, and high-temperature exposure), and then a recovery control (e.g., a decrease of the reference temperature that corresponds to the high temperature output limit, compulsory cooling, SR minimization, battery charging, or fuel cell water generation operation using a fuel cell load) may be performed.

Even when a problem or failure occurs in the air/hydrogen supply system (e.g., failure or error of the air flow rate sensor, emergency operation of the air blower, or emergency operation of a hydrogen supplier), the operation for full open of the opening degree may be performed. Through the above-described fail-safe strategy, the fuel cell performance deterioration and the system malfunction may be maximally prevented, and thus reliability for the variable pressure control may be secured.

In other words, the derived opening degree of the valve may be compared with the detected actual opening degree of the valve, and when the derived opening degree of the valve is greater than the actual opening degree of the valve, the output of the fuel cell may be limited. When the derived opening degree of the valve is greater than the actual opening degree of the valve, the opening degree of the valve may be maximally increased. Further, when the derived opening degree of the valve is greater than the actual opening degree of the valve, the maximum RPM of the air supplier 200 may be limited and the SR may be fixed. When the deviation of the cell voltages of the fuel cell becomes equal to or greater than the predetermined value due to the pressure control, the opening degree of the valve may be maximally increased.

Referring to FIG. 15, in a relative humidity estimation model, as illustrated in the drawing, the relative humidity on the side of the cathode outlet may be estimated using the current, the air flow rate, and the temperature information, and an SR determinator may be configured to determine the target SR based on the estimated relative humidity. In particular, in determining the SR, as illustrated in the drawing, a map type control may be used, and the estimated relative humidity may be fed back based on the target relative humidity to perform PI control.

As internal parameters of the relative humidity estimation model, pressures on the inlet and outlet of the cathode are necessary, and a pressure experimental map for the flow rate may be used without any separate pressure sensor. In particular, during the pressure operation, the pressure may be changed based on the air flow rate and the valve opening degree, and this may exert an influence on the calculation of the relative humidity estimation value. Even during the variable pressure operation, to adopt a more accurate relative humidity estimation model, it is required to use pressure change data based on the opening degree in the variable pressure operation situation, and thus complexity may be increased. Accordingly, the conditions during the atmospheric pressure operation may be applied to the relative humidity estimation model, and during the pressure operation, the SR variable control itself may not be performed.

According to the method for controlling a fuel cell of a vehicle having the above-described configuration, the fuel cell performance deterioration and the system malfunction may be prevented, and thus reliability of the variable pressure control may be secured. The air pressure may be adjusted by the opening degree adjustment valve on the side of the air outlet, and the opening degree adjustment may be performed to prevent an abrupt change of the air pressure caused by an abrupt change of the opening degree. Accordingly, the operation may be performed without deviating from the operation limit region. Further, the hydrogen supply pressure and the air supply SR may be optimally adjusted, and even the fail-safe operation strategy may be proposed in adjusting the air opening degree to secure reliability for the opening degree control.

While the present invention has been described with respect to the specific exemplary embodiments, it will be apparent to those skilled in the art that various changes and modifications may be made without departing from the spirit and scope of the invention as defined in the following claims.

What is claimed is:

1. A method for controlling a fuel cell of a vehicle, comprising:
    determining, by a controller, whether a pressure control for pressing air discharged from an air supplier is necessary based on whether an output of the fuel cell is additionally necessary or whether the fuel cell is in a dry-out state;
    when determined that the pressure control is necessary, deriving, by the controller, an opening degree of a valve required for the pressure control and adjusting the valve based on the derived opening degree of the valve;
    calculating, by the controller, a pressure ratio obtained by calculating:

(current opening degree−first opening degree)/(second opening degree−first opening degree); and increasing, by the controller, a target hydrogen pressure based on an increase of the calculated pressure ratio or an increase of a flow rate of the air discharged from the air supplier,
    wherein the current opening degree is a valve opening degree at the current time, the first opening degree is an opening degree that is required when an air pressure is an atmospheric pressure, and the second opening degree is an opening degree at a time when the pressure control is completed.

2. The method of claim 1, wherein the determination includes determining that the pressure control is necessary when an operation temperature of the fuel cell is equal to or greater than a reference temperature when the output of the fuel cell is equal to or greater than a reference output or if the fuel cell is in the dry-out state.

3. The method of claim 1, further comprising:
    determining, by the controller, whether an atmospheric pressure control for changing a pressure of air discharged from the air supplier to an atmospheric pressure is necessary when flooding occurs during a pressure operation for adjusting the valve with the opening degree of the valve required for the pressure control; and
    deriving, by the controller, the opening degree of the valve required for the pressure control and adjusting the valve based on the derived opening degree of the valve in response to determining that the pressure control is necessary.

4. The method of claim 1, further comprising:
    selecting, by the controller, a target air pressure; and
    deriving, by the controller, a valve opening degree command to follow the selected target air pressure.

5. The method of claim 4, wherein a flow rate of the air that is discharged from the air supplier and the target air pressure respectively have values within preset limit regions with respect to the air flow rate and air pressure.

6. The method of claim 4, wherein the derivation of a valve opening degree command includes deriving the valve opening degree command using an opening degree map in which the target air pressure and the valve opening degree to follow the target air pressure are pre-mapped.

7. The method of claim 6, wherein in the opening degree map, the target air pressure and the valve opening degree to follow the target air pressure are differently pre-mapped based on the flow rate of the air that is discharged from the air supplier and an operation temperature of the fuel cell.

8. The method of claim 6, wherein the opening degree is pre-mapped in which the opening degree during the pressure control is less than the opening degree during the atmospheric pressure control.

9. The method of claim 7, wherein the opening degree map is pre-mapped to decrease a required valve opening degree as the operation temperature of the fuel cell is increased when the target air pressure is equal to the air flow rate.

10. The method of claim 6, wherein the target air pressure includes a first air pressure in an atmospheric pressure state and a second air pressure in a pressure state, and the opening degree map is pre-mapped to adjust a required valve opening degree to be a first opening degree when the target air pressure is the first air pressure and the required valve opening degree to be a second opening degree when the target air pressure is the second air pressure.

11. The method of claim 10, wherein the opening degree map is pre-mapped to decrease the required valve opening degree between the first opening degree and the second opening degree when the target air pressure is in a section in which the target air pressure is increased from the first air pressure to the second air pressure.

12. The method of claim 7, wherein the opening degree map is pre-mapped to change a required valve opening degree with a hysteresis band based on a change of the flow rate of the air.

13. The method of claim 6, wherein the opening degree map is pre-mapped to change a required valve opening degree in process of time when a maximum slew rate is limited.

14. The method of claim 1, further comprising:
    fixing, by the controller, a maximum value of a stoichiometric ratio (SR) to a minimum value when the pressure control is completed.

15. The method of claim 3, further comprising:
    increasing, by the controller, a maximum value of a stoichiometric ratio (SR) based on an increase of the opening degree of the valve during the atmospheric pressure control.

16. The method of claim 14, wherein the fixing comprises adjusting the maximum value of the SR to gradually decrease the maximum value of the SR before the pressure control is completed with a slope and to reach the minimum value when the pressure control is completed.

17. The method of claim 16, wherein the determination of a pressure control completion time is based on calculation of a pressure ratio obtained by calculating:

(current opening degree−first opening degree)/(second opening degree−first opening degree), wherein the current opening degree is a valve opening degree at the current time, the first opening degree is an opening degree that is required when an air pressure is an atmospheric pressure, and the second opening degree is an opening degree at a time when the pressure control is completed.

18. The method of claim 17, wherein the pressure ratio has a value between 0 and 1, the maximum value of the SR is in reverse proportion to an increase of the pressure ratio, and the maximum value of the SR is equal to the minimum value of the SR if the pressure ratio is 1.

19. The method of claim 1,
wherein the level of the target hydrogen pressure increased based on the increase of the flow rate of the air differs based on the pressure ratio.

20. The method of claim 1, further comprising:
comparing, by the controller, the derived opening degree of the valve with a detected actual opening degree of the valve; and
limiting, by the controller, the output of the fuel cell when the derived opening degree of the valve is greater than the actual opening degree of the valve.

21. The method of claim 1, further comprising:
comparing, by the controller, the derived opening degree of the valve with a detected actual opening degree of the valve; and
maximally increasing, by the controller, the opening degree of the valve when the derived opening degree of the valve is greater than the actual opening degree of the valve.

22. The method of claim 1, further comprising:
comparing, by the controller, the derived opening degree of the valve with a detected actual opening degree of the valve; and
limiting, by the controller, a maximum revolutions per minute (RPM) of the air supplier when the derived opening degree of the valve is greater than the actual opening degree of the valve.

23. The method of claim 1, further comprising:
comparing, by the controller, the derived opening degree of the valve with a detected actual opening degree of the valve; and
fixing, by the controller, a maximum value of a stoichiometric ratio (SR) when the derived opening degree of the valve is greater than the actual opening degree of the valve.

24. The method of claim 1, further comprising:
maximally increasing, by the controller, the opening degree of the valve when the deviation of cell voltages of the fuel cell becomes equal to or greater than a predetermined value.

\* \* \* \* \*